United States Patent [19]

Vidal

[11] Patent Number: 5,413,201
[45] Date of Patent: May 9, 1995

[54] DEVICE FOR ENGAGING AND RELEASING OF WHEELS, BY FLUID MEANS

[75] Inventor: Hugo J. Vidal, Sao Paulo, Brazil

[73] Assignee: AVM Auto Equipamentos LTDA., Sao Paulo, Brazil

[21] Appl. No.: 121,595

[22] Filed: Sep. 14, 1993

Related U.S. Application Data

[63] Continuation-in-part of Ser. No. 62,398, May 14, 1993, abandoned.

[30] Foreign Application Priority Data

May 14, 1992 [BR] Brazil ................................ 9201821

[51] Int. Cl.6 .................... F16D 11/00; F16D 25/04
[52] U.S. Cl. ......................... 192/67 R; 192/85 A; 192/85 V; 192/88 A; 192/92; 192/114 R
[58] Field of Search ............... 192/88 A, 93 A, 92, 192/85 V, 85 A, 86, 114 R, 67 R; 403/1

[56] References Cited

U.S. PATENT DOCUMENTS

| | | | |
|---|---|---|---|
| 3,442,361 | 5/1969 | Hegar | 192/114 X |
| 3,455,420 | 7/1969 | Blanchard | 192/114 X |
| 3,472,347 | 10/1969 | Johnson | 192/114 X |
| 3,753,479 | 8/1973 | Williams | 403/1 X |
| 4,281,749 | 8/1981 | Fogelberg | 192/93 A X |
| 4,287,972 | 9/1981 | Petrak | 192/93 A X |
| 4,352,418 | 10/1982 | Teraoka | 192/93 A X |
| 4,694,943 | 9/1987 | Petrak | 192/93 A X |
| 4,960,192 | 10/1990 | Kurihara | 192/85 V X |
| 5,123,513 | 6/1992 | Petrak | 192/88 A X |

Primary Examiner—Rodney H. Bonck
Attorney, Agent, or Firm—Darby & Darby

[57] ABSTRACT

A device for engaging and releasing of wheels by fluid control, applied in vehicles equipped with more than one drive shaft, and with hydraulic, pneumatic or vacuum system responsible for its operation, with such device being mounted within a housing (1) fixed to the wheel hub (2) of the vehicle, within which there is the engaging hub (4) with a serrated portion (4') coinciding with the inner teeth (6') of the engaging element, surrounded by a spring (7); in front of the engaging element (6) there is a cam (8), the inner face of which has a channel (9) in which the studs (10) provided in the outer edge of the cam following part (11) move, with the cam following part being kept in contact with the driving element (12) of the device due to the action of an engaging spring (13) with the cam (8) being mounted directly on the housing (1) or being surrounding the guiding ring (14), provided with horizontal grooves (14').

13 Claims, 6 Drawing Sheets

DEVICE FOR ENGAGING AND RELEASING OF WHEELS, BY FLUID MEANS

CROSS-REFERENCE TO COPENDING APPLICATIONS

This is a continuation-in-part of U.S. Ser. No. 08/062,398, filed May 14, 1993, now abandoned.

BACKGROUND OF THE INVENTION

As is known in the art, vehicles with a four wheel drive system are designed to operate under conditions in which maximum pulling force is required; under such conditions, the driver engages the gear box in order to transmit the power from the engine to the second drive shaft, normally the front one.

During the operation with two wheels (over 90% of the vehicle life), front drive is disconnected, at the gear box; but the front shaft remains always turning, driven by the wheels themselves. This causes a "drag" effect which, besides causing unnecessary wearing of the front shaft, increases fuel consumption and the wearing of the tires, and creates noises and vibrations, which may be harmful for the vehicle's driving.

In order to minimize such inconveniences, engaging/releasing mechanical devices are known, consisting of a shaft which is notched on one of the sides of the front differential box. The shaft remains released when the vehicle is on two wheel drive (4×2) and is engaged by a sliding element, controlled by the drive, when it is necessary to operate the vehicle under four wheel transmission mode (4×4).

Such devices do not solve the above mentioned problems, for they offer only a partial immobilization of the front drive system; even when the vehicle is being operated under two wheel drive mode (4×2), the front wheels drag a front shaft, part of the other shaft and the differential gears, with only the trunnion shaft not turning. In other words, a large number of parts remains connected to the wheels and, as such, the parts remain "dragged", even when the vehicle is operated under the 4×2 system.

In addition, the differential housing has to be specially designed, cast and machined, in order to house the device, with a resulting increase in costs of the original equipment, making its application totally prohibitive in the parts market.

As a solution for the above mentioned inconveniences, engaging systems known in the market as "free-wheel" have been used, which are coupled usually to each of the front wheels. These systems permit the drive to release the wheels from the drive shaft, whenever desired; in vehicles with such devices, while operating with two wheels only (4×2), the wheels are the only parts of the front driving system which remain turning in the same manner as in any other conventional vehicle with two wheel drive system, eliminating, therefore, unnecessary wear of the front driving system and cutting down fuel consumption.

Among the free-wheel devices known in the art, there are the hand driven and the automatic drive devices. The first one engages and releases the wheels to and from the drive shaft through different mechanical means. Although they reach their target in a satisfactory way, they are inconvenient, for they force the driver to get out of the vehicle's cabin whenever four wheel drive becomes necessary and, again, when such a system is no longer necessary.

The automatic devices used in the market do not force the driver to leave the cabin in order to engage/release the wheels, but have other inconveniences, such as a certain complex construction and the need to stop the vehicle and invert its direction, when releasing the wheels; this creates very difficult situations (such as front and back swing, steep slopes, etc.) and creates a bad operation of the transmission systems, with loss of power in the four wheels in critical moments, and untimely wear.

As an improved solution, when comparing with conventional manual and automatic devices, there are other devices in which the engaging of the wheels to the respective drive shafts is performed by a pneumatic, hydraulic or vacuum system, controlled by the driver through a command valve located within the vehicle's cabin, with such a valve forcing an unbalance of pressure within the device and moving the engaging/releasing element in order to either engage or release the wheels to and from the drive shafts, following the driving needs (with two or four wheels).

Said devices eliminate the inconveniences of the manual and automatic devices, and show several advantages, such as: operation within the cabin; they maintain the use of engine braking capacity; it is possible to release the wheels without changing the direction of the vehicle; the front shaft remains immobilized under 4×2 drive; trustworthy; simple construction and installation.

However, such devices still have some inconveniences, which shall be described hereinbelow, classified in the two possible systems: vacuum and pressurized (hydraulic or pneumatic).

In the vacuum system, while operating the vehicle under four wheel mode, the system is kept constantly connected, or under "depression", in such a way that the engaging/releasing device itself and the elements of the vehicle drive shaft are liable to attract, by aspiration, due to the "depression", solid and liquid particles which are close to them. Considering that most vehicles using four wheel drive operate in unfavorable areas (mud, dust, sand, etc.), the retainers located on the drive shaft and on the device, which have a purpose to seal the whole system, are continuously "bombed" by such particles, with heavy wear and short useful life, requiring constant replacements.

In the pressurized (hydraulic or pneumatic) system, constant pressurization of the system when the vehicle is operated under 4×4 mode, has the inconvenience of possible general leakage, derived from the wear of the different components caused by friction and by the fact that they are subject to variable temperatures, which generate deformations.

SUMMARY OF THE INVENTION

With the object of eliminating such inconveniences, the present invention was developed as a new improvement in a device for engaging and releasing of wheels by fluid means, the operation of which being performed by a pneumatic, hydraulic or vacuum system. Such a system does not remain connected during the entire time in which the wheels are engaged to the drive shaft. Instead, it remains connected only during the movement of the engaging/releasing element towards the desired position.

Therefore, in the vacuum system, the useful life of retainers is increased, for they do not remain constantly subject to the attack of solid and liquid particles, as in the devices of prior art. In the pressurized (hydraulic or pneumatic) system, the life period of the retainers is, also, substantially increased, cutting down the possibilities of leakage.

In order to achieve such an object, this invention provides a cam, located within the housing of the device for keeping the device locked in the engaged or released position, after the hydraulic, pneumatic or vacuum system is disconnected. The cam has a groove where a stud, equidistantly spaced one from the other, is provided on the edge of a cam following part which is connected to the element which drives the device. The cam following part moves itself longitudinally and has, on its face opposite to the driving element, an end of a spring. The spring's other end is forced against the engaging element normally provided between the wheel hub and the drive shaft of the vehicle.

When in the releasing position, another spring, located around the engaging hub coupled to the shaft, retains the engaging element away from the shaft, while the engaging spring maintains the cam following part close to the front face of the housing of the device.

When one wishes to engage the wheels to the drive shaft, the hydraulic, pneumatic or vacuum system is turned on and the driving element provided in the device moves, forcing the cam following part to move longitudinally. With such movement of the cam following part, the engaging spring and the engaging element are pushed towards the drive shaft, overcoming the tension of the spring which is around it and compressed, thereby engaging the wheel with the drive shaft (4×4 transmission).

At the same time, the studs of the cam following part are "pushed" through the groove on the cam, until reaching intermediate positions and, at this moment, an appropriate system disconnects the hydraulic, pneumatic or vacuum system. With the pressure from the spring located around the shaft, the spring returns to its original rest position, the studs remain in their intermediate positions, remaining locked under the circumstances. The cam following part remains locked in its position keeping the engaging element connected to the drive shaft; as a consequence, the vehicle remains in the 4×4 mode, with the hydraulic, pneumatic or vacuum system disconnected.

When one wishes to release the wheels from the drive shaft, with the vehicle returning to the 4×2 mode, the hydraulic, pneumatic or vacuum system is connected again, the driving element is actuated once again, moving the cam following part. With such a movement, the part presses slightly the engaging spring, forcing the studs to move out of their intermediate positions where they were and causing the disconnection of the hydraulic, pneumatic or vacuum system. By the action of the two respective springs, which return to their rest positions, the engaging element is forced away from the shaft, and the cam following part is forced to move, once again, towards the front portion of the housing, therefore releasing the wheels from the drive shaft and with the vehicle returning to its 4×2 mode.

One possible form of the disconnecting system for the hydraulic, pneumatic or vacuum system is providing a valve. The valve, when operated, allows the monitoring of pressure variation, generating a signal which shall be sent to a logical digital circuit which, acting on an electrically operated valve, is responsible for the equalization of the system, positioning the engaging element in one of the two different positions (4×2 or 4×4). The circuit operates as a safety system capable of assuring perfect synchronism between the right and left wheels on the drive shaft with the gear box, restraining the non-engagement of any of the wheels in case of failure.

Therefore, if for any reason one of the wheels is not duly engaged to the drive shaft, the valve will not be operated and, as a consequence, the signal will not be sent to the logical digital circuit which, in its turn, will not cut the operation of the pneumatic, hydraulic or vacuum system. The system will remain connected and operating until full engagement or releasing of the wheel and the drive shaft. When the valve is finally operated, the signal will be sent to the logical digital circuit and the system will be disconnected.

Another possible configuration of the system responsible for the disconnection of the hydraulic, pneumatic or vacuum system consists of providing it with a timer which interrupts the operation of the system, at previously determined time intervals, coinciding with the times of movement of the studs of the cam following part, from their initial positions to the intermediate ones, and vice-versa.

The possibilities for the construction of the operating system are many, as well as of the safety system for assuring perfect synchronism of both of the wheels on the drive shaft, resulting in an important increase of the useful life of the retainers.

BRIEF DESCRIPTION OF THE DRAWINGS

In order to illustrate the system according to the invention, reference is made to the accompanying drawings, through which it shall be better visualized.

DESCRIPTION OF THE PREFERRED EMBODIMENTS

Figure 1:
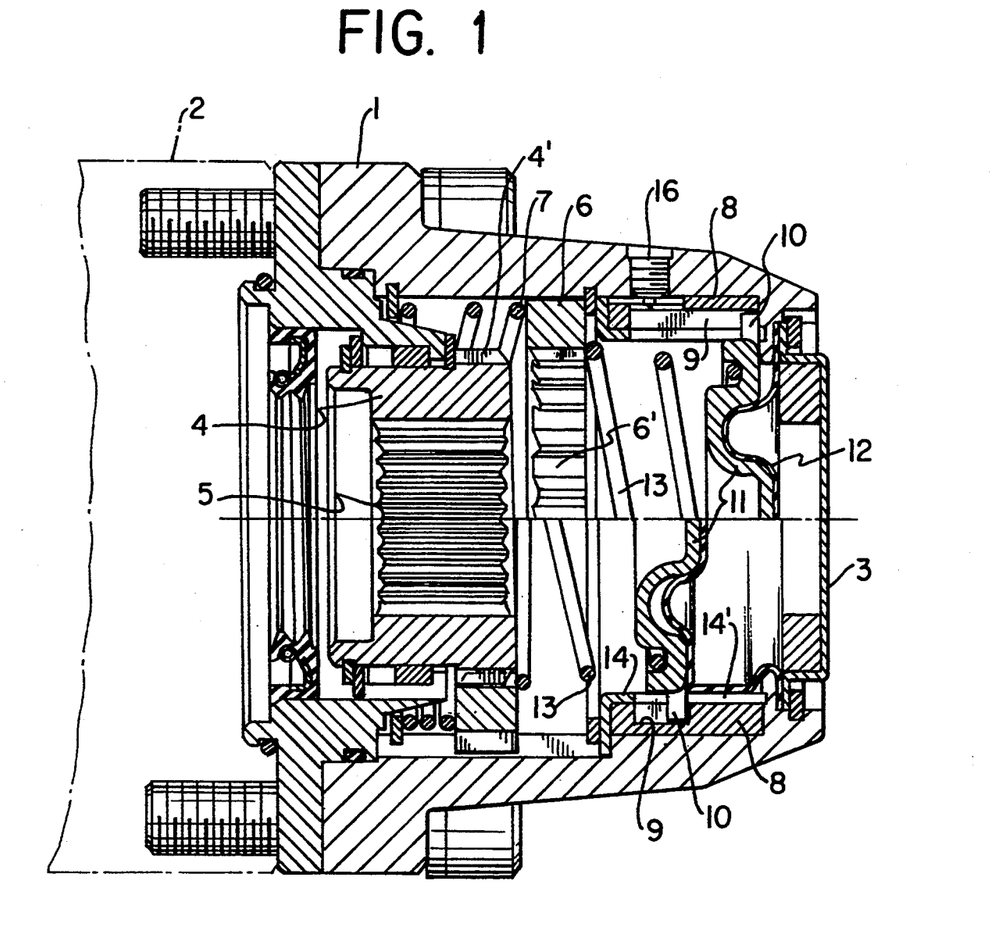
FIG. 1 is a longitudinal cross section of the device now improved, in a vacuum system, showing the released and engaged positions relative to the median longitudinal line, with the upper portion of the drawing showing the device in the released position, while the lower portion shows the same device in the engage position.

Referring to FIG. 1, a device is shown for engaging and releasing of wheels by fluid means, applied in vehicles having more than one drive shaft and with a pressurized (hydraulic or pneumatic) system or a vacuum system, responsible for its operation, with the device being assembled within a housing 1 conveniently fixed to the wheel hub 2 of the vehicle, and provided with a lid 3 conveniently fitted in its front portion. Within the housing 1 there is an engaging cylindrical hub 4 with internal groove 5, with such groove connecting the notched end of the optional drive shaft of the vehicle, not shown, with the hub 4 having an outside serrated portion 4', complementing the inner teeth 6' of an engaging element 6, which forms the element which determines the "engaged" and "released" positions between the drive shaft and the wheel hub 2, and the housing 1 connected to it; around the engaging hub 4 there is a spring 7 which keeps the engaging element 6 away from the hub, therefore maintaining the whole set in the released position.

The outside serration portion 4' of the hub 4 has external serrations or teeth which complement the inner or internal teeth 6' of the engaging element 6 with the hub 4 in the disengaged position of FIG. 1, i.e., engaging element 6 and the hub 4 are disengaged.

According to this invention, within the housing 1 and in front of the engaging element 6, there is provided a cam 8 with tubular cylindrical ring shape, the inner face of which has channels 9 with specific configuration, described hereinbelow, in which the studs 10 are "pushed", equidistantly spaced on the outer edge of a cam following part 11, with the part kept in contact with the usual driving element 12 of the device, by an engaging spring 13.

Figure 3:
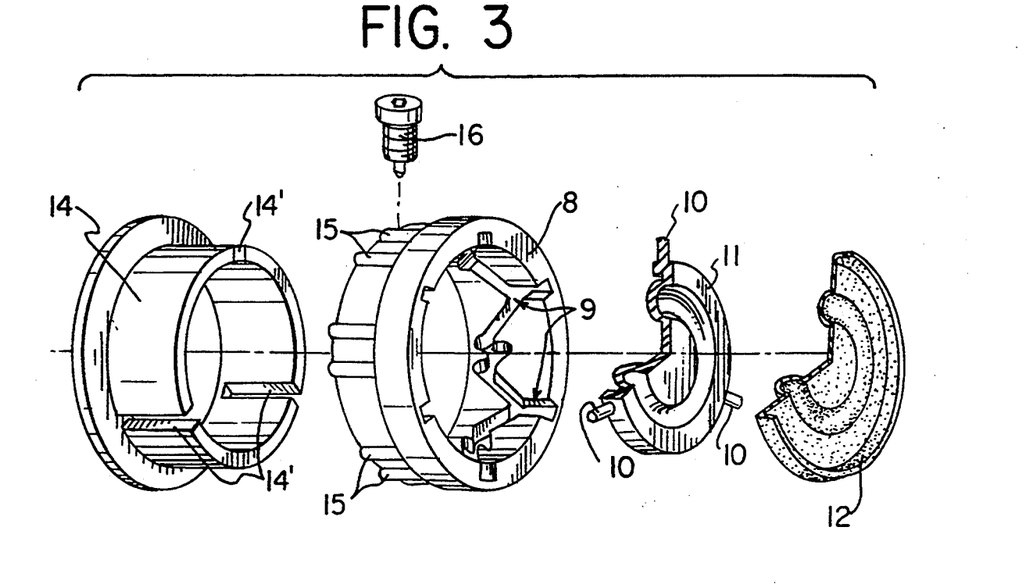
FIGS. 3 and 4 are exploded perspective views of the parts forming the present improvement, in two different construction versions.

In a first constructive configuration of FIGS. 1 and 3, the cam 8 is assembled surrounding a guiding ring 14, conveniently fixed to the housing 1 and provided with horizontal grooves 14' in a number equal to the number of studs 10 of the cam following part 11. Since the studs 10 go through the horizontal grooves 14' of the guiding ring 14 before entering the channels 9 of the cam 8, they are forced to move longitudinally only, therefore forcing the movement of the part 11 longitudinally also. On the other hand, since the studs 10 move in the channels 9 of the cam 8, this longitudinal movement of the studs force the turning of the cam 8, following the course of the channels, with the cam determining the locking positions which are responsible for the maintenance of the engagement element 6 in the "engaged" and "released" positions after the interruption of operation of the hydraulic, pneumatic or vacuum system, as explained in more detail hereinbelow. In such a manner, the cam following part 11 moves longitudinally, not turning, while the cam 8 is turning, forced by the studs 10 of the part 11 which move along the channels 9 of cam 8.

Figure 2:
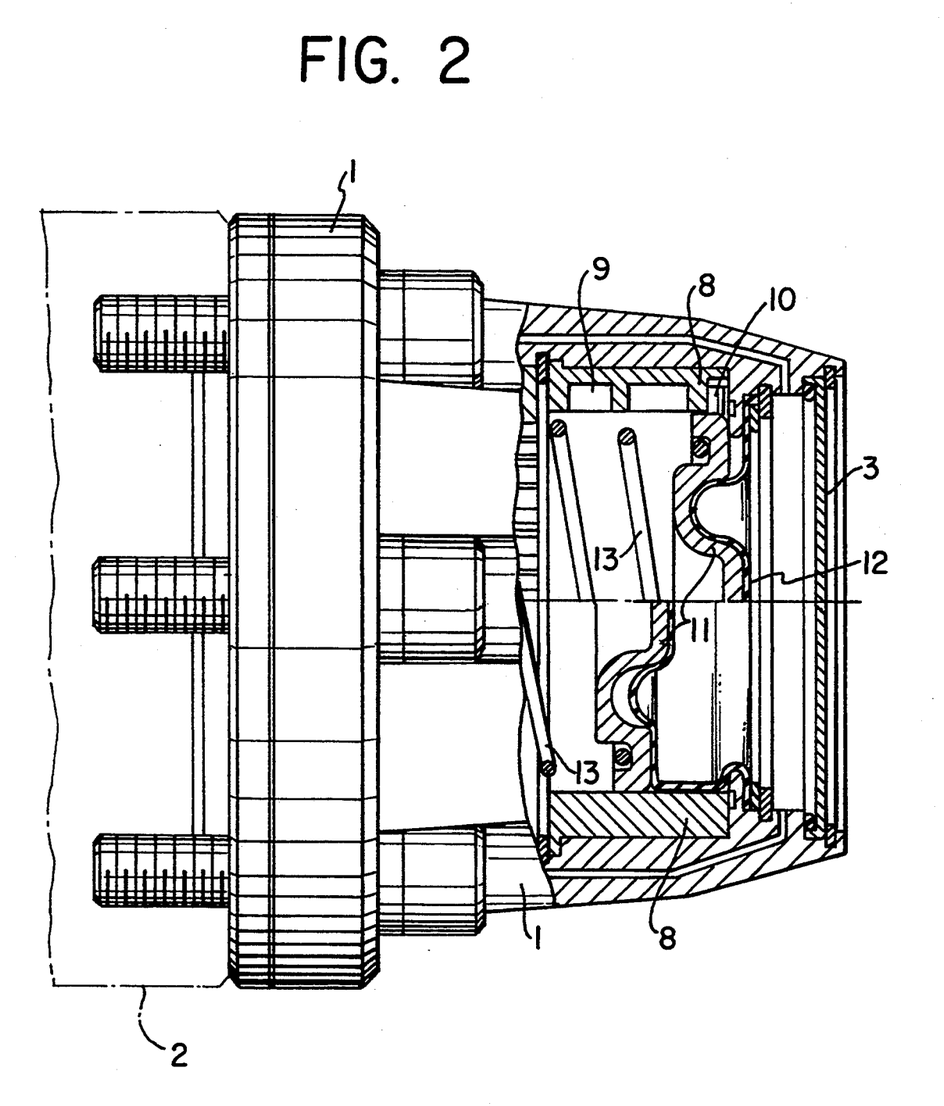
FIG. 2 is a partial longitudinal cross section of the device, now in a pressurized (hydraulic or pneumatic) system, showing also the released and engaged positions with respect to the median longitudinal line.
Figure 4:
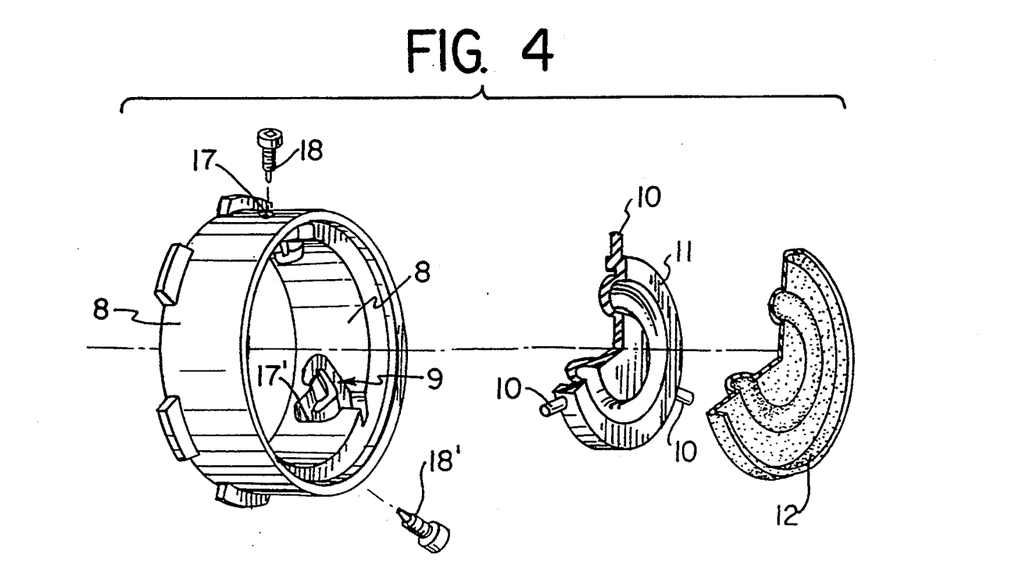

In a second configuration of FIGS. 2 and 4, cam 8 is directly fixed to the housing 1 in such a way that it can not turn. In this case, with the longitudinal movement of the cam following part 11, and with the studs 10 within the channels 9 of the cam 8, the studs are forced to turn, following the channels, and the cam 8 will determine the locking positions which are responsible for maintaining the engaging element 6 in the "engaged" or "released" position (to be explained hereinbelow). In this configuration, cam 8 does not turn and the cam following part 11, besides moving longitudinally, turns, forced by the studs 10 which are within the channels 9 of the cam 8.

Figure 5:
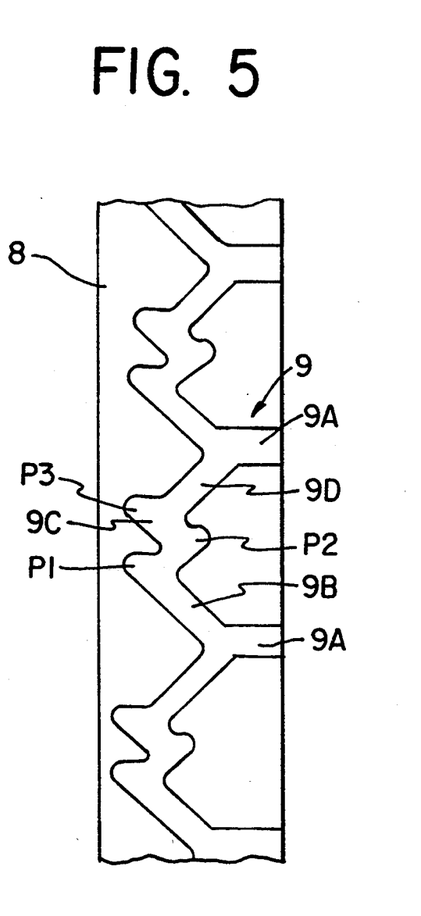
FIGS. 5 and 6 are enlarged detailed drawings of the grooves provided in the inner face of the cam, shown in the two different versions of FIGS. 3 and 4, respectively.

As shown in detail in FIG. 5, channels 9 of cam 8 are made in identical repetitive segments continuously connected amongst themselves, each one of them formed by an initial straight and horizontal portion 9A made from the front edge of the cam 8, interconnected to an intermediate portion which is biased 9B, and followed by a sinuous portion 9C, in a stylized "V" shape, which is connected to another intermediate portion 9D tilted in an opposite direction of the 9B, with the portion 9D being connected to the horizontal portion 9A of the following segment. The sinuous portion 9C of each segment demarcates the formation of three "stops" for the studs 10 of the cam following part 11, P1, P2 and P3 respectively, through the locking or releasing of the engaging element 6.

Figure 6:
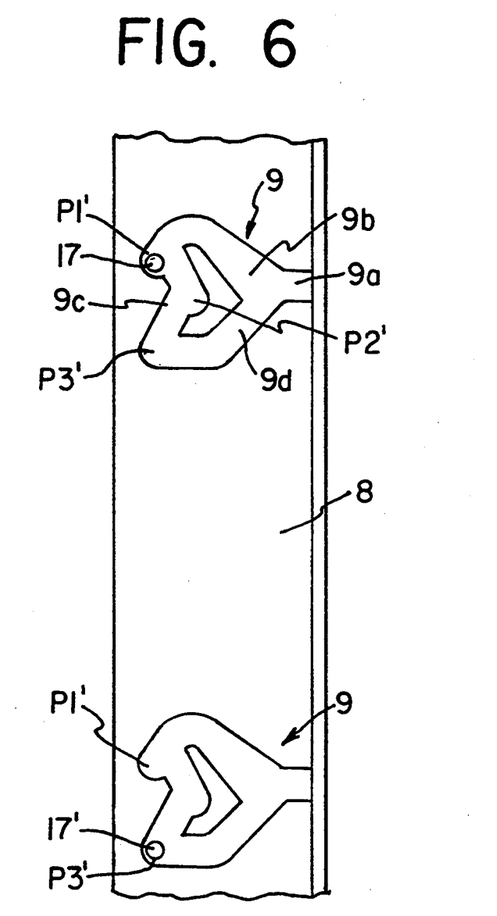

As shown in details in FIG. 6, channels 9 of cam 8 are made in repetitive identical segments, spaced one from the other, each one of them having the shape of a stylized "Y", with the first portion 9a being straight and horizontal, from the front edge of said cam 8, while between the biased portions 9b and 9d of the "Y", a sinuous portion 9c is formed, which demarcates the position of the same three "stops" for the studs 10 of the cam following part 11, P1', P2' and P3', respectively, which are responsible for the locking or releasing of the engaging element 6, as explained hereinbelow.

When a four wheel drive is needed, the vacuum (FIG. 1) or pressurized (FIG. 2) system is operated, the driving element 12 moves forcing the cam following part 11 which, in the first configuration (FIGS. 1 and 3) is forced to move longitudinally only, without turning, in accordance with the horizontal grooves 14' of the guiding ring 14, with the studs 10 of the part 11 passing through the grooves. In the second configuration (FIGS. 2 and 4) the cam following part 11 is forced to move longitudinally and to turn, due to the action of the studs 10, for the cam 8 being fixed to the housing 1 can not turn.

With the movement of the cam following part 11, the part pushes the engaged spring 13 and the engaging element 6 towards the engaging hub 4, connected to the drive shaft, overcoming the action of spring 7 located around the shaft and which is pressed. With this, the engagement of the engaging element 6 with the engaging hub 4 is achieved (vehicle in 4×4 mode) (see lower portion of FIGS. 1 and 2).

At the same time, the studs 10 of the cam following part 11 "follow" the channels 9 provided in the cam 8, passing from the portion 9A (first version) and 9a (second version) where they were, to the respective biased portions 9B and 9b, until reaching the stop points P1 (first configuration) and P1' (second configuration); at this moment, a driving system of any appropriate type disconnects the vacuum system (FIG. 1) or the pressurized system (FIG. 2). When the driving element 12 stops pushing the part 11, the spring 13 and the engaging element 6 towards the inside, then the spring 7 returns to its resting position, but only until the studs 10 of the part 11 "hit" the stop points P2 (first configuration), and P2' (second configuration), limited by the sinuous portions 9C and 9c of channels 9 of cam 8. This is a position which locks the device in the "engaged" position—the engaging element 6 connected to the engaging hub 4—even when the vacuum or pressurized system is not working.

In other words, when the cam following part 11 remains locked in such a position by the fact that its studs 10 are in the stop points P2 and P2' of cam 8, the engaging element 6 is kept interconnected to the engaging hub 4 coupled to the optional drive shaft and, consequently, the vehicle remains in the 4×4 mode, without the vacuum or pressurized system being under operation.

When releasing the wheels from the drive shaft with the vehicle returning to the 4×2 mode, the pressurized or vacuum system is operated again, the driving element 12 moves, once more, forcing part 11 inwards. With this movement, the part 11 creates a slight pressure on the engaging spring 13, for the engaging element 6 is already engaged to the engaging hub 4 and it has no more room to move. Simultaneously, the studs 10 leave the stop points P2 first configuration) and P2' (second configuration) where they were, and move themselves towards stop points P3 and P3'. When again, an appropriate driving system disconnects the vacuum or pressurized system, and the driving element 12 releases the part 11; with this, spring 13 and then the spring 7 returns to the rest positions, forcing the return of the cam following part 11, with its studs 10 following the biased portions 9D (first configuration) and 9d (second configuration) of channels 9, it is forced to move away from the engaging element 6, returning to its position close to the front portion of the housing 1, and its studs 10 are, again, received by the front portion of the horizontal, straight portions 9A and 9a of channels 9.

With this, the release of the engaging element 6 from the engaging hub 4 is achieved, with the hub 4 being connected to the optional drive shaft, and, consequently, the vehicle returns to its 4×2 mode.

Forming one of the possible configurations of the driving system responsible for the releasing of the system in the vacuum option, there are, in the first configuration of cam 8 (see FIGS. 3 and 5), pairs of projections 15 located on its outer face, respectively coinciding with the stop points P1 and P3 of cam 9. Such projections are responsible for the driving, by contact, of a release valve 16 mounted on the housing 1 of the device and when operated, allows the entering of atmospheric pressure within the device, therefore the system, which was depressurized (see FIGS. 1 and 3).

In this way, with the operation of the vacuum system, cam 8 turns, due to the movement of the studs 10 of part 11, along portions 9A and 9B of its channels 9, until reaching the stop points P1. With the turn of the cam 8, a projection 15 operates the release valve 16, which allows the inlet of atmospheric pressure, thereby reducing the vacuum; such a fast reduction of the vacuum within the system is sensed by a vacuumstat (not shown), which interrupts the operation of the vacuum system through an electronic signal sent to the logical digital circuit 32. The driving element 12 releases the cam following part 11 allowing its return, due to the action of spring 7, until the studs 10 stop in the stop points P2, as previously explained, with this position locking the device in the "engaged" position, with the vacuum system disconnected.

In the same manner, with the new operation of the vacuum system, cam 8 turns, due to the movement of the studs 10 from the stop points P2 to the stop points P3 and, with such a turn, another projection 15 operates, again, the release valve 16, allowing the entering of atmospheric pressure, thereby reducing the vacuum, sensed by the vacuumstat, generating an electronic signal which is sent to the logical digital circuit, which interrupts, again, the operation of the vacuum system. Again, the driving element 12 releases the cam following part 11, the part returning to the initial position due to the pressure of springs 7 and 13, until the studs 10 return to the front end of the portions 9A, as explained before.

In accordance with a second configuration of cam 8 (see FIGS. 4 and 6), two holes are provided in the cam, one 17 located, coincidentally with a stop point P1' of one of its three channels 9, and the other 17' located coincidentally with a stop point P3' of another channel 9, this arrangement being preferred due to its physical arrangement. Coinciding with holes 17 and 17' are two valves 18 and 18' respectively, mounted on the housing 1 of the device. The pistons of the valves 18, 18', for going through the holes, may be driven by the studs 10 of part 11, when driven by vacuum.

In this way, with the operation of the vacuum system, part 11 moves and turns, due to the movement of its studs 10 along the portions 9a and 9b of channels 9 of cam 8, until reaching stop points P1'. With the turning of the cam following part 11, valve 18 located in one of said stop points P1' is operated by one of the studs 10, generating a signal which is sent to a logical digital circuit which operates an electrical valve and is responsible for the equalization of the system, interrupting the operation of the vacuum system. The driving element 12 then releases the part 11, allowing its return, due to the action of spring 7, until its studs 10 stop in the stop points P2', as explained before, with such a position locking the device in the "engaged" position, with the vacuum system remaining disconnected.

In the same manner, with a new operation of trip vacuum system, the cam following part 11 moves and turns, due to the movement of its studs 10 from the stop points P2' to the stop points P3', when the other valve 18' located in one of said points P3' is operated by one of its studs 10 generating a signal which is sent to the logical digital circuit 32, interrupting the vacuum. Again, the driving element 12 releases the cam following part 11, allowing its return, now due to the pressure of the springs 7 and 13, until the studs 10 return to the front end of portions 9a, as explained above.

The logical digital circuit 32, responsible for the reading and interpretation of the signal sent to it by the vacuumstat, operates as a safety system, capable of assuring a perfect synchronism between the right and left wheels of the vehicle with the gear box; in this way, if due to any reason, one of the wheels does not engage properly to the drive shaft, the release valves 16 and 18 will not be operated and, as a consequence, they will not send any signal to the logical digital circuit which would not interrupt the operation of the vacuum system. The system will operate, continuously, until the proper engagement between the wheel and the drive shaft is completed, when the release valves 16 and 18 will be operated, the signal will be sent to the logical digital circuit and the system will be disconnected.

In the option of pressurized (hydraulic or pneumatic) system, the construction of the driving system responsible for the disconnection of the system is made through a pressure sensor (pressurestat) on the pressure line, eliminating valves 16 and 18 of the vacuum system, and upon reaching the necessary pressure said sensor will send a signal to the system control which, at that moment, will open the system releasing the pressure through another channel which is not the inlet one.

Another configuration for the driving system responsible for the releasing of the hydraulic, pneumatic or vacuum system is to provide a timer (not shown), which interrupts the operation of the system at previously determined time intervals coinciding with the times periods for the moving of the studs 10 within the channels 9 of cam 8, more specifically, from the portions 9A/9a to the stop points P1/P1', and from stop points P2/P2' to the stop points P3/P3'.

Figure 7:
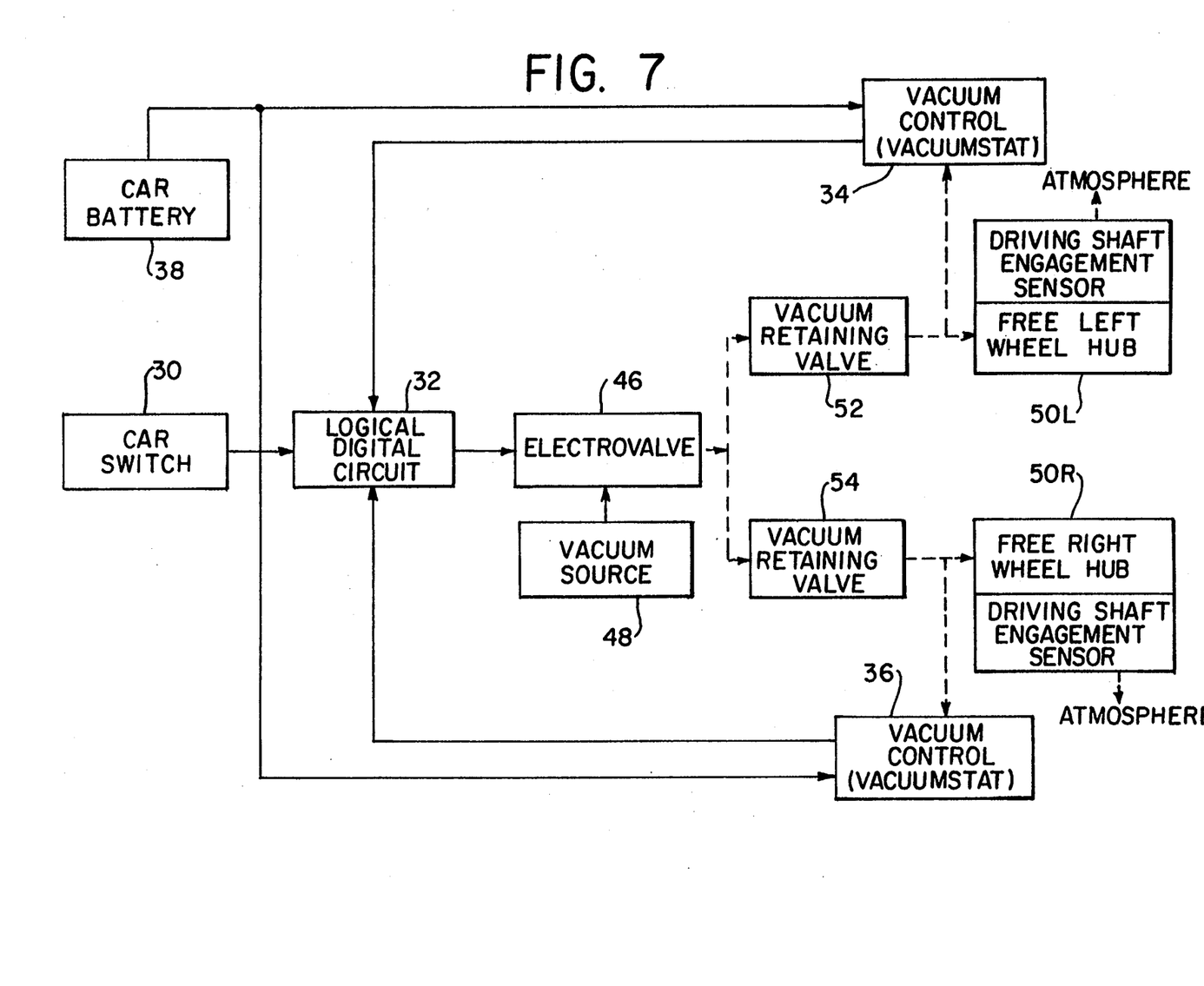
FIG. 7 is a block diagram showing the control system in accordance with the present invention.
Figure 8:
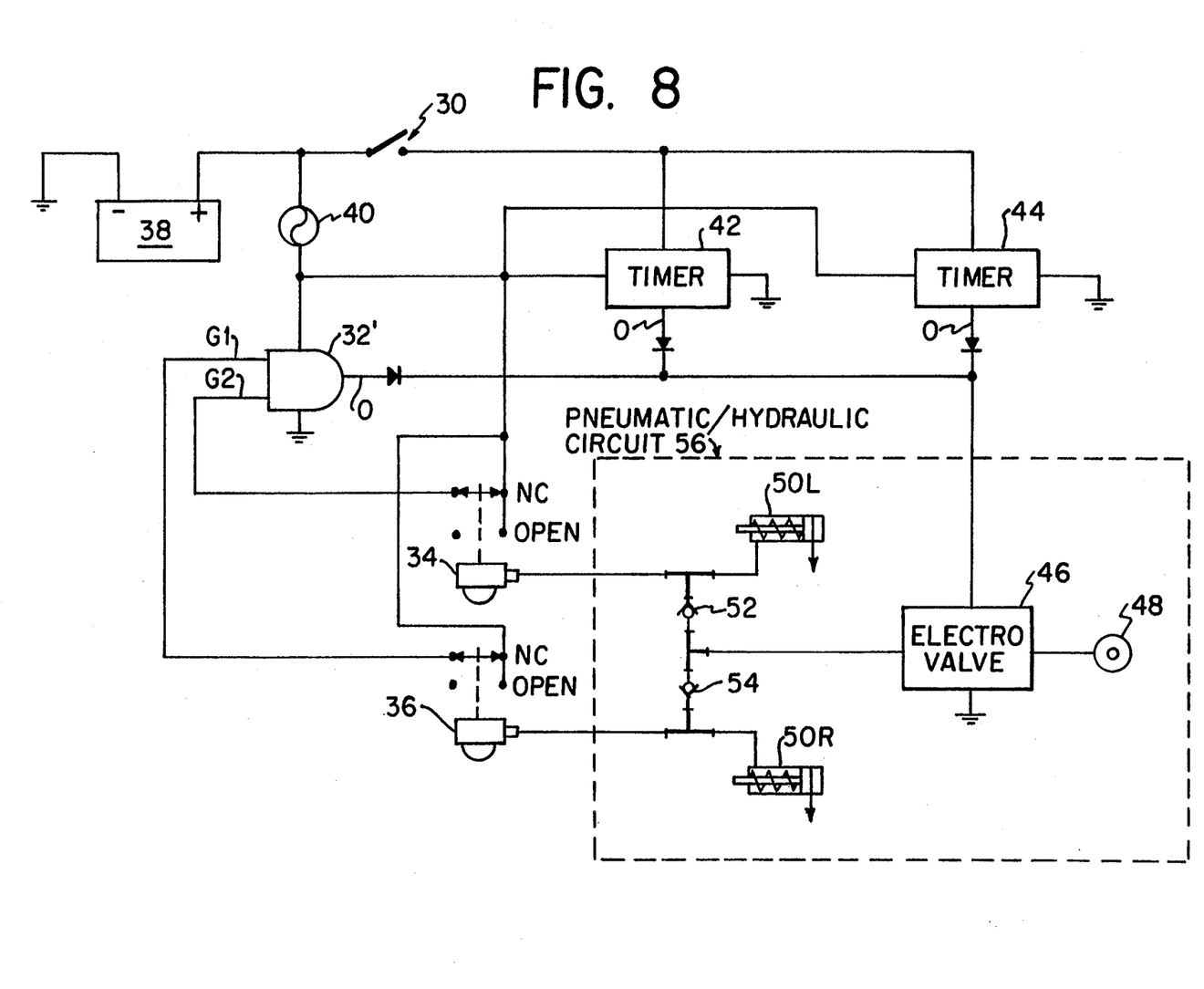
FIG. 8 is a schematic circuit diagram of a preferred embodiment for carrying out the invention in accordance with FIG. 7.

In order to effect the perfect synchronism envisioned by the invention between the right and left wheels of the vehicle with the transfer or gear box (see FIGS. 7 and 8), the following conditions arise:

When there is a signal in the two vacuumstats, both inlet gates of the logical digital circuit will be in high level. In such a case, a high level signal will be given at the output gates which will close the electrovalve, cutting the vacuum action.

When there is no signal in the vacuumstats (free wheel corresponding to the disengaged condition), one of the input gates of the logical digital circuit will not have a signal. In such a case, the electrovalve will continue to furnish a vacuum in the system.

FIG. 7 is a block diagram of a control circuit suitable for practicing the present invention. The functional blocks shown include a car switch 30, a logical digital circuit 32, vacuumstats 34, 36, a car battery 38, an electrovalve 46, a vacuum source 48, free left and right wheel hubs 50L, 50R, vacuum retaining valves 52, 54, and drive shaft engagement sensors.

FIG. 8 diagrams a suitable electronic control circuit which fulfills the function blocks in accordance with FIG. 7. Electrical signal lines are shown in solid black; vaccum lines are shown dotted.

When the car switch 30 is open, the output O of the NAND gate or NAND 32' is in LOW because inputs G1 and G2 of the NAND 32' are in HIGH. This is because the vacuumstats 34 and 36 are in the normally closed position NC, receiving tension from the battery 38 by means of fuse 40. The outputs O of the timers 42 and 44 are also in LOW. Therefore, there is no tension which opens the electrovalve 46 and consequently there is no vacuum in the system.

When the switch 30 is closed, only the timer 42 is activated, since it works with a positive pulse discharge, while the timer 44 remains inactive. The timer 42 functioning means that its output O is in HIGH level, feeding the electrovalve 46 which opens the vacuum for the system. The NAND 32' retains output O in LOW level.

When the vacuum reaches the vacuumstats 34 and 36, they are activated and the contacts thereof open, moving to an OPEN position. This cuts the tension in G1 and G2 and the levels thereof become LOW. Consequently, output O of NAND 32' goes to level HIGH, feeding the electrovalves 46, which maintain the vacuum open, allowing the timer 42 to disconnect, without cutting the vacuum in the system.

While the vacuum source 48 is activated, the free wheels 50L and 50R are activated in that they become engaged. On each free wheel 50L and 50R is an internal valve, which at the time of engaging opens the respective vacuum line branch to the atmosphere. This opening causes the vacuum in such a branch to drop to zero, but without affecting the vacuum in the other branch because of the use of the vacuum retention valves 52 and 54 found in the input of the vacuum of each branch. These vacuum retention valves 52, 54 retain the vacuum in one branch even though the vacuum in the other may have dropped to zero.

When the vacuum drops in a certain branch, the respective vacuumstat returns to the initial position and the contacts thereof move to position NC, sending a high level signal to one of the NAND 32' inputs. Assuming that the vacuum of the other branch still remains, due to a delay in the engaging of the other free wheel, the respective vacuumstat will remain activated with the terminals in the OPEN position. In this situation, the NAND 32' is in one input in HIGH level and the other in LOW. Consequently, the output O thereof will be in HIGH level, maintaining the electrovalve 46 open and feeding the system with vacuum, as if it were waiting for the second wheel to engage.

When the second free wheel is engaged, the vacuum of this branch will drop, deactivating the vacuumstat the contacts of which will be in position NC. At this point, the NAND 32' will present its two inputs G1 and G2 in HIGH level passing exit O thereof to LOW level, thereby cutting the electrovalve 46 which will close off the vacuum to the system.

In this way, the free wheels 50L and 50R will remain engaged while the switch 30 remains on.

When the switch 30 is turned off, the monostable timer 44 is activated. Since this timer functions as a negative pulse discharger, the output O thereof consequently passes to HIGH level activating the electrovalve 46 which will open the vacuum to the system. The cycle described hereinabove is repeated until the two free wheels are disengaged, when the vacuum will be cut and the system will be in a condition to start the initial cycle once again.

The NAND 32' is characterized by the following logic truth table:

| INPUTS | | OUTPUT |
|---|---|---|
| G1 | G2 | 0 |
| LOW | LOW | HIGH |
| LOW | HIGH | HIGH |
| HIGH | LOW | HIGH |
| HIGH | HIGH | LOW |

If the NAND 32' is used in a control circuit for a vehicle whose work tension voltage is 12 volts, the levels in the input and the output can be only 0 volts (low level) or 12 volts (high level). There is no possibility for an intermediate voltage level of, say, 8.2 volts.

In other words, if in input G1 there are 0 volts and in input G2 there are 0 volts, output O of NAND 32' would have 12 volts. If in either one of the inputs there is 0 volts and in the other there is 12 volts, the output would have 12 volts. If the two inputs have 12 volts, the output would have 0 volts.

The present invention attains synchronism between the left and right wheels by the action of the vacuumstats 34, 36 and the logical circuit NAND 32' in conjunction with vacuum retention valves 52 and 54, which are each placed on a respective one of the two branches. The valves impede the drop in the vacuum in one of the two branches from affecting the other branch.

This way, once one free wheel is engaged, the vacuum in the branch for this one free wheel is cut, but without affecting the vacuum in the other branch whose free wheel has not yet been engaged. Only after the two free wheels have been engaged, is the vacuum cut. Suitable vacuum retention valves 52 and 54 may be those manufactured by Brosol. The pneumatic or hydraulic circuit 56 is comprised of these retention valves 52 and 54, the left and right wheels 50L, 50R and the electrovalve 46.

These are only a few examples of construction for the driving system and the safety system of the inventive device, and it is quite obvious from this disclosure that other configurations, covering mechanical, electronic or vacuum systems, or a mixture thereof, may be obtained.

What is claimed is:

1. A device for engaging and releasing of wheels by fluid means, applied in a vehicle equipped with more than one drive shaft and with any one of a hydraulic, pneumatic and vacuum system responsible for operation, said device being mounted within a housing attachable to a wheel hub of the vehicle, said device comprising a cylindrical engaging hub that has internal grooves for engagement with a notched end of one of said drive shafts of the vehicle; engaging means for determining engaged and released positions between the one drive shaft and the wheel hub, said engaging means including an engaging element having inner teeth, said cylindrical engaging hub having a serrated outer portion that is arranged complementing said inner teeth of said engaging element; biasings spring means for biasing said engaging element out of an engaged position with said wheel hub and into a released position away from said wheel hub; means for determining locking positions for maintaining said engaging element in one of said engaged and released positions after interruption of the operation of the any one of the hydraulic, pneumatic and vacuum system, said determining means including a cam and including a cam following part having an outer edge, said engaging element being between said cam and said cylindrical engaging hub, the cam having an inner face with a channel; means for forcing one of said cam and said cam following part to turn for determining the locking positions, said forcing means including studs movable in said channel, said studs being equidistantly spaced in the outer edge of said cam following part; a driving element; and engaging spring means for biasing said cam following part in contact with said driving element, said driving element being responsive to operation of the any one the hydraulic, pneumatic and vacuum system for driving said cam following part inwardly to push said engaged spring means toward said engaging hub and overcoming bias of said biasing spring means so as to thereby push said engaging element into engagement with said engaging hub, said cam being fixed directly to any one of the housing and around a guiding ring provided with grooves which number the same as the number of studs of the cam following part.

2. The device of claim 1, wherein the channel of said cam is constructed with repetitive identical segments including a straight line initial portion starting from a front edge of said cam, said initial portion being interconnected to an angled median portion, followed by a sinuous portion interconnected, in turn, to another median portion angled in an opposite direction to that of the angled median portion, said another median portion being interconnected to the straight line initial portion of a next one of the segments, the sinuous portion of each of the segments determining a formation of three stop locations for the studs of the cam following part.

3. The device of claim 1, wherein the cam has a plurality of channels made in repetitive identical segments, spaced one from the other, each having a shape, an initial portion of which extends in a straight line starting from a front edge of said cam, while, between median portions of the shape, there is a sinuous portion determining three separate stop locations for the studs of the cam following part.

4. The device of claim 1, wherein the vehicle is equipped with a vacuum system, pairs of projections being located in coincidence with stop locations on an outer face of the cam, with said projections operating, by contact, a release valve mounted on the housing, thereby allowing atmospheric pressure to enter within the device, pressurizing the system and reducing the vacuum, and responding to such a drop in vacuum by originating a signal which is monitored by a vacuumstat, which interrupts the operation of the system through an electronic system sent to a logical digital circuit.

5. The device of claim 4 wherein the logical digital circuit operates as a safety system, capable of assuring synchronism of engagement with the right and left wheels of the vehicle.

6. The device of claim 1, wherein the cam has two holes therein, one of said holes coinciding with one of a plurality of stop locations of one of three channels, and the other of said holes coinciding with another stop location of another of the channels, with said holes coinciding with respective valves mounted on the housing, the valves having pistons which may be driven by the studs of the cam following part, with said valves generating a signal sent to a logical digital circuit and being responsible for equalization of pressure in the system and interrupting the operation of the system.

7. The device of claim 1, wherein a pressure sensor is provided on a pressure line, which sends signals to a control system, opening the system and depressurizing through another channel.

8. The device of claim 1, wherein there is provided a timer which interrupts the operation of said system, at previously determined time intervals.

9. A device useful in a system for engaging and releasing of vehicle wheels by fluid means from a fluid supply system that remains connected for supplying the fluid means for a portion of an entire time in which the wheels are engaged with a drive shaft of the vehicle and that disconnects to cease supplying the fluid means for a remaining portion of the entire time in which the wheels are engaged with the drive shaft, the device comprising:

engaging/releasing means for selectively engaging and releasing a hub of the vehicle with the drive shaft of the vehicle;

cam means for maintaining said engaging/releasing means in a selected one of an engaged position and a released position, said cam means including a cam having an inner face with a channel;

a cam following part having studs movable in said channel and being equidistantly spaced in the outer edge of the cam following part (11);

a driving element responsive to actuation of said engaging/releasing means for moving to force said cam following part to move longitudinally and for engaging the vehicle wheels with the drive shaft; and biasing means for keeping said studs in contact with said driving element, said cam being fixed around a guiding ring provided with grooves that allow insertion therethrough of the studs, respectively, to reach said channel of said cam, said studs being forced to move longitudinally in response to displacement of said driving element, said cam following part being forced to move longitudinally together with said studs, said cam being movable in response to movement of said studs in said channel.

10. The device of claim 9, wherein the channel of said cam is constructed with repetitive identical segments including a straight line initial portion starting from a front edge of said cam, said initial portion being interconnected to an angled median portion, followed by a sinuous portion interconnected, in turn, to another median portion angled in an opposite direction of the angled median portion, said another median portion being interconnected to a straight line initial portion of a next one of the identical segments, the sinuous portion of each of the segments determining a formation of three stop locations for the studs of the cam following part.

11. The device of claim 9, wherein the cam has a plurality of channels made in repetitive identical segments, spaced one from the other, each having a shape, an initial portion of which extending in a straight line starting from the front edge of said cam, while, between biased portions of the shape, there is a sinuous portion determining three separate stop locations for the studs of the cam following part.

12. The device of claim 9, further comprising control means for synchronizing engagement of right and left wheels of the vehicle with operation of said cam, said cam following part and said biasing means.

13. The device of claim 12, wherein said cam, said cam following part and said biasing means cooperate for keeping the wheels locked after disconnection of the fluid means.

* * * * *